FIG. 3.

United States Patent Office 3,038,032
Patented June 5, 1962

3,038,032
ELECTRONIC TRANSCEIVING DISTRIBUTOR
TELEGRAPH SYSTEM
Charles P. Bukowski, Cos Cob, and Charles A. Wesley,
Ridgefield, Conn., assignors to The Teleregister Corporation, Stamford, Conn., a corporation of Delaware
Filed June 8, 1959, Ser. No. 818,650
4 Claims. (Cl. 178—53.1)

This invention relates to code transmission and receiving systems and more particularly it relates to systems for transmitting and receiving coded signals such for example as telegraph code combinations and the like.

A principal object of the invention is to provide an electronic transceiving distributor for use in coded telegraph systems and the like.

Another object is to provide a novel electronic distributor and associated circuits whereby the electronic distributor can be used to receive and translate a series of time sequential coded signal elements into a corresponding set of time parallel coded signal elements for operating devices such as telegraph or tape recorders or similar telegraph recording devices; and also the said electronic distributor can be used to translate a set of time parallel coded signal elements into a corresponding series of time sequential signal elements for application to a signal transmission channel.

Another object is to provide an electronic transceiving distributor which is selectively operable either as a transmitting distributor or as a receiving distributor for coded telegraph signals, and is especially adapted for use with synchronous terminal equipment such as buffer storage units, selectors and decoders, such as are frequently associated with data processing systems and the like.

A feature of the invention relates to an electronic distributor, as distinguished from the rotary mechanical distributors usually employed in telegraph systems, in conjunction with selectively controlled circuits whereby the same electronic distributor can be converted substantially instantaneously from a receiving distributor to a transmitting distributor.

A further feature relates to a high speed electronic transceiving distributor which is stable in operation, and which can be readily adjusted to accommodate to startstop telegraph signals, and which is free from the undesirable characteristics of mechanically rotating distributors.

While the invention is not limited to any particular kind of intelligence to be transmitted and received, it is of outstanding advantage in connection with so-called large-scale data processing equipment, which latter equipment usually includes input and output devices located at a plurality of respective remote stations which are to communicate with a centrally located computer or data memory apparatus which serves the stations in common. Such remote stations may include operational gear such as keysets for transmitting coded data to the central equipment, printers, tape recorders or other visual display apparatus for recording the coded information sent to the central station, as well as recording the answer-back information resulting from the operation of the central apparatus. It is economical and convenient to connect such remote stations to the central equipment by means of data transmitting links using conventional printing telegraph duplex or half-duplex circuits operating, for example, with binary "mark" and "space" code signals and with the transmitting and receiving equipments at the stations synchronized by well known startstop telegraph technique. Messages transmitted to and from the remote stations generally comprise groups of characters, the number and sequence of the characters in the message having unique significance. For example, in data processing systems, the message may comprise a so-called address character for addressing the particular part of the memory device concerned, and followed by a number of information characters, upon which the central equipment is to operate, for example for computation, revision, and the like, of the previous information stored in the memory. At the remote stations particularly, the equipment for receiving and decoding the answer-back information or messages from the central equipment are usually required to operate in business offices where they must remain reliable in operation for extended periods without frequent cleaning or adjustment. It is also desirable under such conditions that the said equipment be relatively insensitive to ambient dust, mechanical wear, or changes in atmospheric conditions, and usually they must operate without appreciable noise, mechanical vibration, and without requiring continuous lubrication.

Accordingly, one of the features of the invention is to provide a novel electronic transceiving distributor which is capable of high speed operation using as the distributing element a step-by-step beam switching tube, which tube can be instantaneously converted from a receiving distributor to a transmitting distributor and under control of precisely timed associated electronic equipment.

A still further feature relates to the novel organization, arrangement and relative interconnection of parts which cooperate to provide an improved electronic transceiving coded impulse distributor system.

Other features and advantages not particularly enumerated will become apparent from the following detailed descriptions and the appended claims.

In the drawing, which shows one typical embodiment of the invention.

Figure 1:
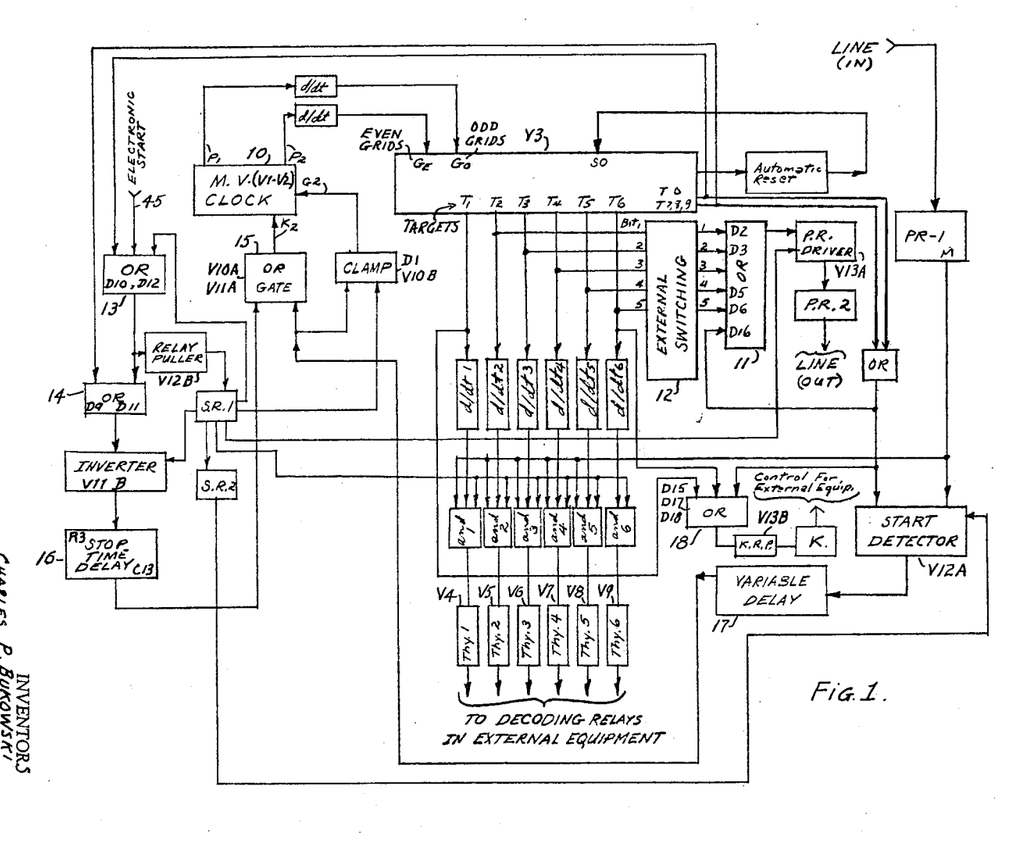
FIG. 1 is a schematic block diagram showing the more essential parts of the system embodying the invention and their interconnection.

Referring to FIG. 1 there is shown a functional block diagram of a system embodying the combination of the electmronic transceiver distributor according to the invention. This distributor is composed of the following principal components.

(1) A multivibrator clock 10, composed of tubes V1 and V2 connected as an astable gated multivibrator, which provides a source of timing pulses which are connected to alternate control grids of the counter tube V3, which may be of any well known electron beam stepping kind. These pulses alternately pulse the even and odd numbered grids of the magnetic beam counter tube V3, thus advancing the beam from target to target.

(2) The counter tube V3 may, for example, be a magnetron beam switching tube such as a Burroughs-Haydu Type 6700, provided with means to develop a shiftable electron beam and a series of output target electrodes and associated spade electrodes and respective control grids. The beam may be advanced from one target to another as the even and odd numbered grids are alternately pulsed by the astable multivibrator. The tube contains ten identical arrays of spaces, targets, and grids numbered T0 and T1 to T9 inclusive, symmetrically arranged around a central cathode and included in an axial magnetic field. For a detailed description of a typical stepping tube, reference may be had to "Electronics" magazine for April 1956, pages 122–126, published by McGraw-Hill. In the transmit mode of operation, targets 2 to 6 inclusive are connected to the "External Switching" source 12, the setting of whose contacts provide the distributor with five information bits in parallel which comprise the character to be transmitted. The source 12 may be any well known coding device such as a telegraph keyset or keyboard, tele-printer transmitter machine for translating each message character into a coded combination of mark and space signal elements, including a start element, a stop element, and five permuted signal elements. In the receive mode, these same targets T2 to T6 are coupled to the grids of five output thyratrons T$hy$2–T$hy$6, whereby a received signal in serial teletype format received from the line (IN) is stored and read-out in parallel form.

(3) An OR gate 11 comprises diodes D2—D6 and diode D16, which will produce a signal on its single output lead if any one input lead is energized. Input leads 1—5, corresponding to diodes D2—D6, are energized when the beam of tube V3 strikes the corresponding targets 2—6, providing also that the code contacts of the "External Switching" source 12 are also closed. Input lead 6, corresponding to diode D16, is energized whenever the beam of tube V3 dwells on targets 7, 8, 9, and 0.

(4) A polar relay driver tube V13A which drives transmitting polar relay PR–2 whenever there is an output signal from OR gate 11. PR–2 transmits a train of pulses to the sending line (OUT) corresponding to the code group set in by the "External Switching" source 12. Tube V13A is allowed to function during the transmit condition only.

(5) A relay puller tube V12B which conducts when it receives an input signal from OR gate 13, composed of diodes D10 and D12, in response to the application of a start signal to the "Electronic Start" wire. Conduction of tube V12B energizes switching relays SR–1 and SR–2 in order, which perform the various switching functions necessary to place the transceiver distributor in the transmit condition. Tube V12B remains energized throughout the entire transmit mode of operation. Removal of the electronic start signal from one OR gate input, plus application of a negative signal to the other input when the beam of counter tube V3 strikes target (0), opens OR gate 13 which therefore cuts off tube V12B, releasing relays SR–2 and SR–1, in that order. Release of relays SR–1 and SR–2 switches the distributor from the transmit mode to the receive mode of operation. Tube V12B remains deenergized throughout the complete receive cycle.

(6) An inverter tube V11B which conducts as long as there is no signal on either input leg of OR gate 14, composed of diodes D9 and D11. Tube V11B conducts throughout the transmit cycle, except when the beam of counter tube V3 strikes target 7, 8, 9. Conduction of tube V11B allows clock multivibrator 10 to operate by controlling OR gate 15 in combination with start detector V12A. When the beam of counter tube V3 strikes targets 7, 8, 9, tube V11B is cut off by the input signal applied through one leg of OR gate 14. The output of tube V11B, after being delayed one half pulse interval by stop time delay circuit 16, composed of resistor R3 and capacitor C13, stops clock multivibrator 10 through one leg of OR gate 15. This begins the formation of the "stop" pulse, it being understood that each of the permuted signal elements, whether mark or space, are of the same unit time length, whereas the "stop" pulse is of one and a half time units. When the beam of tube V3 leaves targets 7, 8, 9, the input signal is removed from OR gate 14 causing tube V11B to revert to the "on" condition, which allows multivibrator 10 to operate again. Tube V11B is held "off" throughout the receive condition of the distributor. This removes one input to OR gate 15. This allows the multivibrator 10 to be controlled only by means of the other input lead to OR gate 15 during receive operation.

(7) Stop time delay circuit 16 composed of variable resistor R3 and capacitor C13. This circuit permits control of the duration of the stop pulse formed during transmit operation.

(8) OR gate 15, composed of tubes V10A and V11A, prevents operation of clock multivibrator 10 whenever there is an input signal on either input leg of the gate.

(9) In the receive condition, a start detector tube V12A, acting through OR gate 15, holds multivibrator 10 "off" until relay PR–1 operates in response to an incoming start pulse. Tube V12A then triggers clock multivibrator 10 "on," which switches counter tube V3 in synchronism with the incoming line pulses. When the distributor is switched into the transmit condition, a pair of contacts of relay SR–2 disable tube V12A for the entire transmit cycle. Once again, disabling tube V12A causes multivibrator 10 to operate.

(10) A variable delay circuit 17, composed of resistor R1 and capacitor C14, which delays the multi-vibrator trigger pulse received from start detector tube V12A for one half an input pulse interval, thus causing the distributor to sample the incoming information pulses substantially at their mid-points.

(11) A relay puller tube V13B which energizes relay K during the time the beam of counter tube V3 dwells on targets 2—5. When said beam strikes target 6, tube V13B is deenergized via one input of OR gate 18, composed of diodes D15, D17 and D18. This releases relay K which is held "off" by means of other inputs to OR gate 18 during the time the beam of tube V3 switches through targets 6, 7, 8, 9, 0, and 1. Release of relay K signals the external equipment of the end of an input character in the receive condition of the distributor, and also of the end of a transmitted character when in transmit operation, thus allowing the external equipment, for example a perforated tape device, to advance the tape to the next combination of holes.

(12) A gated clamp tube V10B improves the stability of clock multivibrator 10 by limiting the maximum grid excursion of tube V2 of the multivibrator during the rest pulse in the receive mode of operation.

(13) An automatic reset which comes into operation automatically if, for any reason, the beam of tube V3 should be extinguished so as to insure that the beam is automatically reset to the "0" target position.

(14) Various sets of pulse differentiation circuits designated $d/dt$, $d/dt2$, etc.

*General Description*

When the system is in transmitting condition, the electronic distributor receives its input over fire signal conductors connected to corresponding contacts on the external equipment 12. The sixth conductor is used as a start conductor. The five signal conductors are connected to corresponding five pairs of input contacts in the external equipment. Five diodes D2–D6 prevent interaction between these five inputs. These five inputs are scanned by the beam stepping tube V3 which is driven by the multivibrator 10.

As pointed out above, tube V3 is a magnetron beam stepping tube, and is provided with associated circuit controls so that it functions both as a transmitting distributor and as a receiving distributor. During transmission, the auxiliary circuit for each of the conditions is such that each of five targets is connected through a separate set of contacts to a common conductor. Each set of contacts is either opened or closed. Thus, as the beam strikes one of these targets, the negative charge at the target will be transferred through the contacts to the lead only if the contacts are closed. If the contacts are open, the charge cannot appear across the lead. The charges which appear across the common lead are used to drive the relay PR–2 which transmits the information over the line. During receiving, on the other hand, the auxiliary circuit is such that each of the above five targets is connected to a grid of the corresponding thyratron. Also connected to the grid of each thyratron is a source of voltage which varies in accordance with the incoming line pulses or signal elements being received. This voltage is high if the line is marking; low if spacing. Each target (and thus each thyratron) is associated with one element of the incoming character. The beam is so synchronized that, during the mid-point of an incoming signal element, the beam leaves the target associated with that pulse. As it leaves the target, the charge on the target becomes (effectively) positive, raising the grid of the associated thyratron. However, this charge, by itself, is not sufficient to fire the thyratron. In order that the thyratron fire, the other source connected to the grid must also be high. If the other source is low, the thyratron will not fire. This source is regulated by the particular incoming signal element being received, as mentioned above. The output of each of the five thyratrons is connected by means of a separate lead to the external equipment 12.

Assume that the external equipment 12 causes three sets of input contacts to be closed: 1, 3 and 5. This represents one character whose first, third, and fifth bits are marked. This character must be transmitted over the line (in serial form) to a remote location. To understand how this character is transmitted, assume that the beam of the tube has left target zero and reached target 1 in its sweep. At this point, there is no negative signal on the grid of V13A. V13A is therefore conducting, and its plate current is at a maximum. This current flows through one coil of relay PR-2. This is sufficient to cause relay PR-2 to operate to the spacing side, and the "M" (marking) contacts of PR-2 (connected to the line) thus remain open. This forms the start pulse. When the beam strikes target 2, the negative charge received by this target is transferred through closed input contacts 1 to the grid of V13A. This cuts off the current through V13A. When this occurs, current stops flowing through the above-mentioned coil. However, there is a steady current flowing through another coil of PR-2, and this coil causes the relay to operate its "M" contacts to the line. As the beam leaves target 2, the negative voltage is removed from the target (and grid) and V13A again conducts, causing relay PR-2 to again "space" and open its "M" contacts. Thus, the first bit of the character has been transmitted over the line. When the beam moves on to strike target 3, the negative charge received by this target is prevented from appearing on the grid of V13A because input contacts 2 are open. Thus, during the time that the second bit is being scanned, V13A conducts, and PR-2 spaces, transmitting a space-bit over the line. When the beam hits target 4, the same series events takes place as occurred for target 2, and PR-2 operates its "M" contacts, signifying transmisison of the third bit over the line. When the beam hits target five, PR-2 spaces, transmitting the non-marked fourth bit. As the beam strikes and leaves target 6, PR-2 operates and releases accordingly, transmitting the fifth, or final, bit of the character over the line. As the beam scans the remaining targets 7, 8, 9, 0 and 1, which contain no character information as such, the external equipment has time to release the old character from the input contacts and replace it by a new one, which is transmitted in the same way as described above. It should be noted that the above description concerns only the counter tube, and is, therefore, only partially explanatory of circuit operation. The complete sequence of events is given hereinbelow.

Figure 2A:
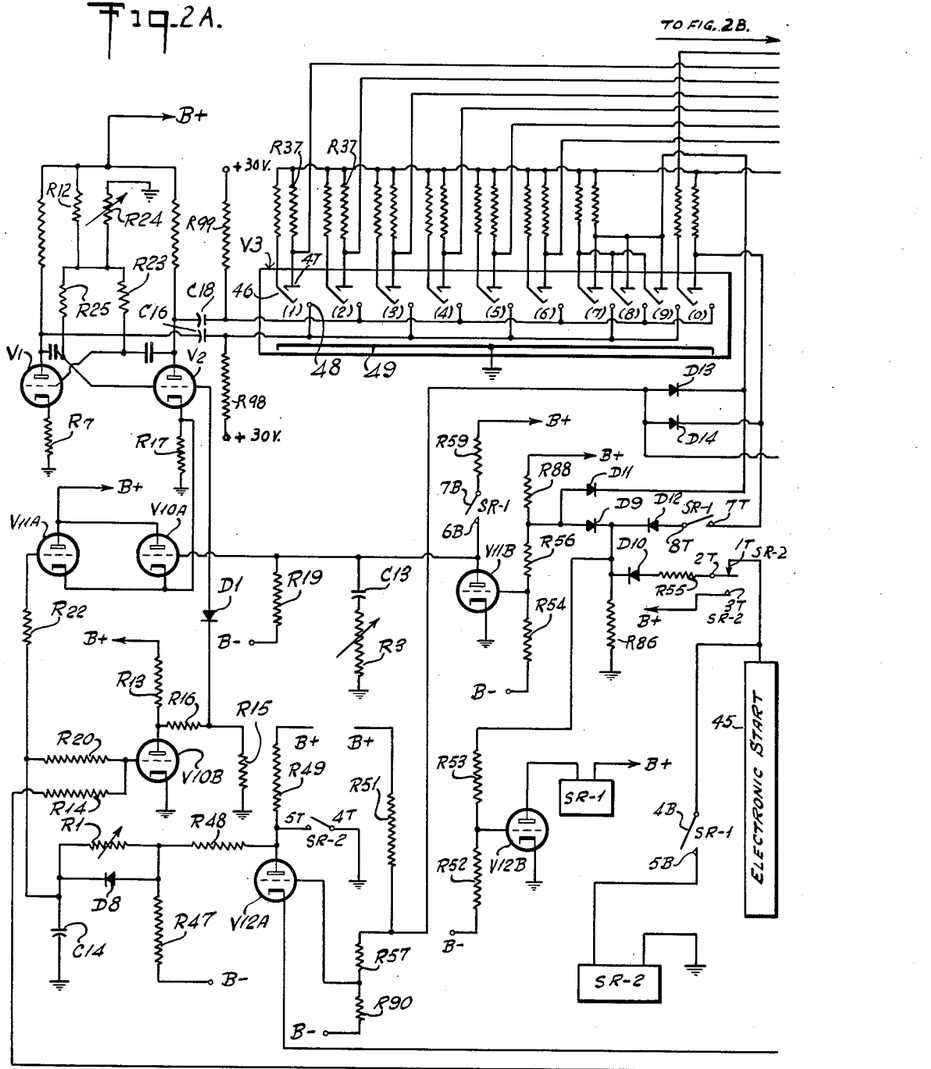
FIGS. 2A and 2B, when placed side-by-side with FIG. 2B to the right of FIG. 2A, provide a complete schematic wiring diagram of a system embodying the invention.
Figure 2B:
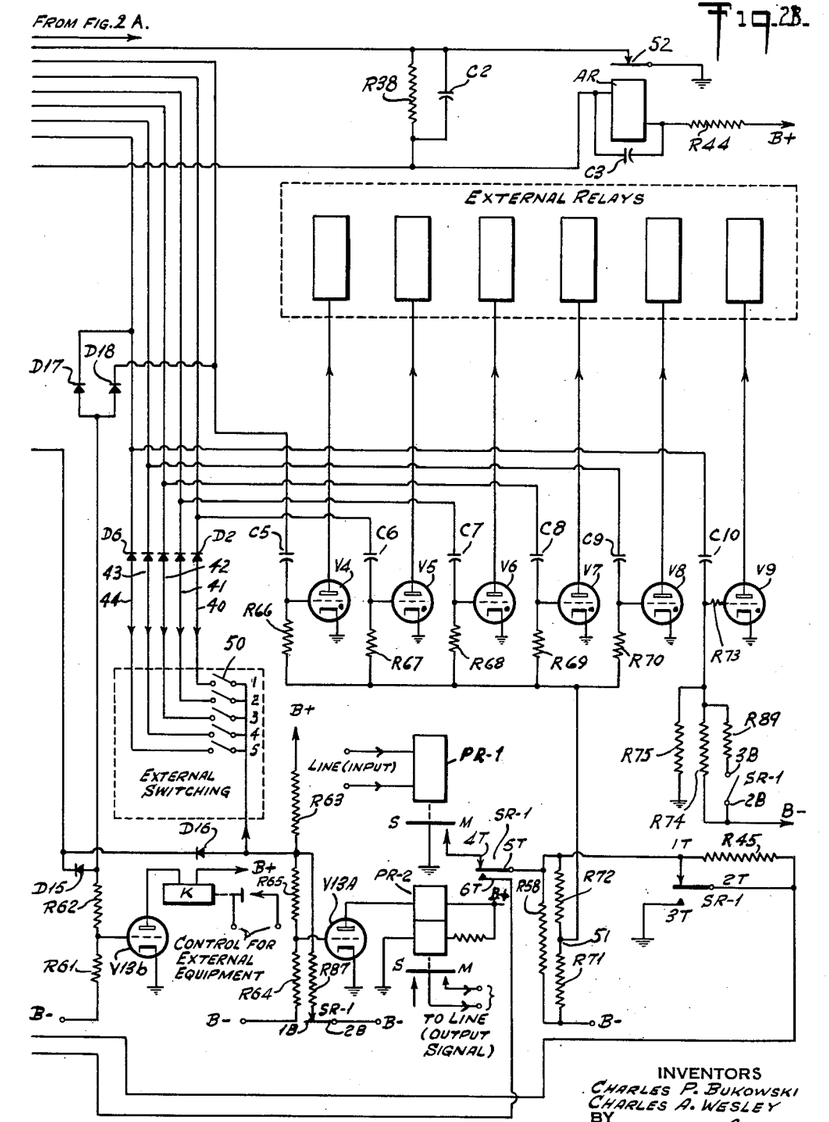

Referring now to FIGS. 2A and 2B, the detailed operation of a system embodying the electronic transceiver distributor will now be described, it being observed that the corresponding parts of FIG. 1 and FIGS. 2A, 2B bear the same designation numerals. The description will begin by assuming the distributor is in the receive condition with no incoming signals being received. It will also be assumed that the stop condition is a "marking" condition and accordingly the description will proceed with the tongue of relay PR-1 on its mark contact, and it is desired to transmit information furnished by the external equipment 12 in parallel in the form of five permuted signal elements of mark and space, over leads 40—44, FIG. 2B. Switching from the receive condition to the transmit condition is initiated by the application of the electronic start signal from source 45, FIG. 2A to the distributor by the external equipment. This signal can be for example positive 125 volts, and it is not removed until transmitting is completed. Prior to the application of the start signal, diode D10 has zero volts on its anode end and diode D12 has an open circuit at its anode end due to open contacts 7T, 8T of relay SR-1. The voltage divider from ground to the negative supply voltage composed of resistors R86, R53, and R52, biases the grid of relay puller tube V12B to cut-off. The electronic start signal 45 is applied to diode D10, which is one half of an OR gate comprising diodes D10 and D12, through closed contacts 1T, 2T of switching relay SR-2. Diode D10 conducts causing the grid of tube V12B to go positive. Tube V12B conducts which pulls in relay SR-1 causing the following to occur:

(1) Contacts 4T, 5T of relay SR-1 are opened, removing the "marking" contact of relay PR-1 from the voltage divider (R71, R72) in the grid return circuit of the five output thyratrons V4–V8. Simultaneously contacts 1T, 2T of relay SR-1 open, and contacts 2T, 3T close, applying ground to the right side of resistor R45. The voltage divider from ground to the negative supply, composed of resistors R45, R58 in parallel with R71 and R72, inactivates tubes V4–V8 by driving point 51 highly negative whenever the distributor is transmitting.

(2) The negative potential at the junction of resistors R58 and R72 is coupled to the grid of clamp tube V10B through closed contacts 5T, 6T of relay SR-1 and resistor R14. Clamp tube V10B is held cut-off all during the transmit condition since it is required only during receiving operation of the distributor, as will be explained hereinafter.

(3) Target (0) of counter tube V3 is connected to the other half of the OR gate, diode D12, through closed contacts 7T, 8T of relay SR-1. This has no effect on tube V12B since the other leg of the OR gate, diode D10, already has a positive input in the form of the electronic start signal.

(4) Contacts 1B, 2B, FIG. 2B, of relay SR-1 open, reducing the negative bias on the grid of driver tube V13A for polar relay PR-2, allowing it to function as required for transmitting.

(5) Contacts 2B, 3B of relay SR-1 close, increasing the negative bias on the grid of tube V9. This prevents V9 from firing for the entire transmit cycle, even when it receives a positive pulse from target (6).

(6) The plate of inverter tube V11B is connected to its load resistor R59 through closed contacts 6B, 7B of relay SR-1. Tube V11B therefore conducts, since its grid is positive.

(7) Switching relay SR-2 is energized by connection of its coil to the start signal through closed contacts 4B, 5B of relay SR-1.

Operation of relay SR-2 causes the following to occur:
(1) The electronic start signal is removed from diode D10 and replaces it by the positive supply source by closing contacts 2T, 3T of relay SR-2. This serves to keep tube V12B operating, and therefore relay SR-1 operated, throughout the transmit condition.

(2) Disables start detector tube V12A for the entire transmit cycle by applying ground potential to its plate through contacts 4T, 5T of relay SR-2. Since it was the positive plate voltage of tube V12A, acting through gate tube V11A, that held clock multivibrator 10 off, said multivibrator is now free to operate. Grounding the plate of tube V12A cuts off tube V11A because of the increased negative bias at its grid as determined by the voltage divider composed of resistors R48 and R47 connected to the negative supply voltage. As tube V11B is also conducting, its plate voltage is low, biasing the grid of gate tube V10A beyond cut-off. Since tubes V10A and V11A are both off, they supply no current to resistor R17 in the cathode of tube V2. The clock multivibrator, composed of tubes V1 and V2, therefore operates. The distributor is now in the transmit condition.

Figure 3:
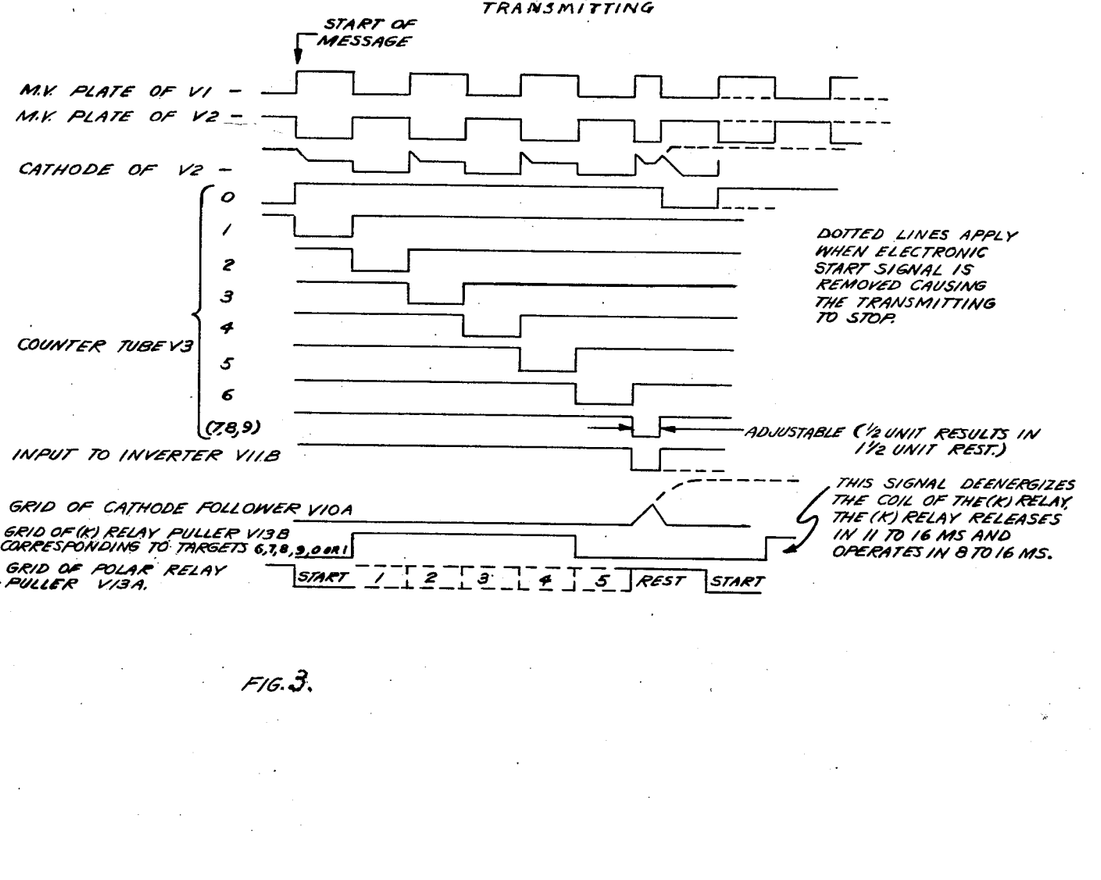
FIG. 3 is a series of correlated wave diagrams explanatory of the system of FIGS. 2A and 2B when in the transmitting condition.

The clock multibrator circuit 10 is connected as a conventional astable gated multivibrator circuit well known in the art. Removal of V11A current from R17 in the cathode circuit of V2 by the switching operation described above allows V2 to conduct. The negative going plate voltage on V2 is capacitively coupled to the grid of V1 in the well known manner causing conduction in V1 to decrease. This increases the plate voltage of V1 which is applied to all the odd numbered grids of tube V3 through capacitor C16. Simultaneously, the negative going plate voltage of V2 is coupled through capacitor C18 to all the even numbered grids of tube V3. This action causes the beam in tube V3 to advance from target 0 to target 1. The beam of the tube V3 is advanced from target to target as long as the astable multivibrator operates. The timing diagram of FIG. 3 illustrates this switching action.

The magnetron beam switching tube V3 disclosed has ten identical positions numbered consecutively from (1) to (9), and (0). Each position of the tube consists of three basic electrodes, namely a spade 46, a target 47, and a switching or control grid 48. A common cathode 49 connected to ground is also included. Each target is connected through individual resistors such as R37 through an automatic reset relay AR and through a common voltage dropping resistor R44 to a source of positive potential. Therefore, as the beam is switched from the common cathode onto a target, the target potential drops and rises again when the beam is switched to the next target. Targets 7, 8 and 9 are connected together for seven and a half unit code operation as described herein. When the beam reaches target 7 it is rapidly switched through targets 7 and 8 to target 9. This switching can be considered to be instantaneous for all practical purposes, and is a characteristic of the tube itself, and not of the external circuitry. Each of the targets 2 to 6 is individually connected to the cathodes of diodes D2 to D6 respectively, and also to the grids of output thyratrons V5 to V9 respectively, through coupling capacitors C6 to C10. The anodes of diodes D2 to D6 are individually connected to the terminals of input code contacts 50. The diodes D2 through D6 prevent undesirable interaction between the five input leads 40 to 44. The common terminal of code setting contacts 50 is connected to the control grid of polar relay driver V13A through resistor R65. The output of the tube V13A operates a relay PR-2, preferably a polar relay which transmits negative and positive pulses to the output line in accordance with the operation of the relay. The code contacts 50 are permutatively set in open and closed positions in accordance with the code combination of intelligence pulses to be transmitted, and may, for example, be transmitting contacts of a tape transmitter, contacts of a rotary switch, or other suitable contacts. It will be assumed for the purposes of explanation that the external equipment causes three sets of input code contacts 50 to be closed, for example, contacts 1, 3 and 5. This represents a character whose first, third and fifth bits are marked.

The energization of relays SR-1 and SR-2 in response to the electronic start signal causes the beam in tube V3 to advance from target 0 to target 1, as described previously. At this point there is no negative signal on the grid of V13A since target 1 is not connected to the grid of V13A. Note also that the contacts 1B, 2B of relay SR-1 are now open, removing the source of negative bias from the grid of V13A. Polar relay driver tube V13A is therefore conducting, and its plate current flows through one coil of polar relay PR-2. This causes relay PR-2 to operate to the spacing side, and the "M" (marking) contacts of relay PR-2 thus remain open. This forms the start pulse which is always a "space." It should be noted that when the beam is on target 1, V13A will always conduct in the transmit mode, and relay PR-2 will therefore always be in a "spacing" condition. The "space" pulse precedes each transmitted character.

The next pulse from clock multivibrator 10 advances the beam of tube V3 from target (1) to target (2). The negative signal on target (2) is transmitted to the grid of tube V13A through diode D2, closed contacts (1) of the external equipment, and resistor R65. This cuts off current flow through V13A and therefore through the coil of relay PR-2. This causes the marking contact of relay PR-2 to close to the line and transmit a marking pulse for the first information bit. When the beam advances to target (3), the negative potential on this target is prevented from appearing at the grid of V13A because contacts (2) of the external equipment are open. Therefore, V13A conducts, relay PR-2 is energized, and a "spacing" pulse is transmitted over the line representing the second information bit.

Following pulses from the clock multivibrator 10 continue to advance the beam to target positions 4, 5 and 6. The condition of polar relay driver tube V13A and relay PR-2 are determined by the open or closed condition of the respective sets of contacts 50, which thus determine whether marking or spacing pulses are transmitted to the line. The wave forms of FIG. 3 illustrate this operation.

As mentioned above, when the beam strikes target (7), it is rapidly switched through targets (7) and (8) to target (9). The negative potential which exists at these targets is coupled through diode D11 and resistor R56 to the grid of inverter tube V11B. This negative bias cuts off tube V11B, and its plate voltage therefore rises at a rate determined by resistor R3 and capacitor C13. This exponential voltage is applied to the grid of gate tube V10A, causing V10A to conduct when its cutoff bias is exceeded. For seven and a half unit code operation, the time delay before tube V10A conducts is equal to one half the duration of each code element or intelligence pulse. Gate tube V10A conducts heavily through R17, the cathode resistor of tube V2. This biases V2 to cutoff, stopping the action of clock multivibrator 10. The positive plate voltage of tube V2 and the negative plate voltage of tube V1 cause the beam of tube V3 to advance from target (9) to target (0). When the beam locks on target (0), the negative potential is removed from the grid of tube V11B allowing V11B to conduct. The drop in plate voltage of tube V11B cuts off gate tube V10A allowing clock multivibrator 10 to operate and switch the beam of counter tube V3 through another cycle. The stop time delay circuit composed of variable resistor R3 and capacitor C13 introduce a delayed rise in the voltage applied to the grid of tube V10A, which controls operation of the astable multivibrator 10. This delay is variable permitting variation in the duration of the stop pulse formed. A variable stop pulse insures proper timing between transmitted characters and also permits the distributor to be used with an odd code such as a 7.42 unit code, if desired.

The stop or rest pulse is used to give the external equipment time to place the next character on the input contacts of the distributor, and is formed after the five information bits have been transmitted. As can be seen from FIG. 3, the length of the stop pulse is one-and-a-half time units and is equal to the time that the beam is on targets (7), (8), (9) and target (0). The stop pulse is formed by applying the negative potential on target (7), (8), (9) to the grid of tube V13A through diodes D13 and D16, and the negative potential on target (0) to the grid of tube V13A through diodes D14 and D16. This negative bias cuts off tube V13A causing polar relay PR-2 to invariably transmit a marking pulse over the line. To insure that there is ample time for the external equipment to set up a new character on the input contacts, switching action is initiated when the beam strikes target (6) and ends when the beam reaches target (2). The negative potential on target (6) is coupled through diode D17 to the grid of relay puller tube V13B. Tube V13B is cut off causing relay K in its plate circuit to release. Release of relay K signals the external equipment that the character has been transmitted and a new character can now be set into the input contacts. The negative potential on targets 7, 8, 9 is transmitted through diodes D13 and D15 to the grid of tube V13B and holds relay K off when the beam is on targets 7, 8, 9. Similarly, diodes D14 and D15 transmit the negative potential of target 0, and diode D18 for target (1), to the grid of tube V13B. Thus relay K is held off all during the time the beam dwells on target (6), targets 7, 8, 9, target (0) and target (1). When the beam reaches target 2, a new character has been set into the input code contacts and relay K is again energized. The bottom wave form of FIG. 3 indicates the composite code group of signals for a seven and a half unit code. Each group of the five permuted spacing and marking intelligence pulses is preceded by an equal length spacing start pulse and is terminated by a marking rest pulse one and a half times the length of the other pulses. By employing a different number of positions of beam counter tube V3 as intelligence signal positions, different codes such as a six and a half, eight and a half, etc., can be generated.

At the end of a transmitted message switching to the receiving condition is initiated by the removal of the positive electronic start signal 45 by the external equipment. This causes relay SR-2 to drop out. Contacts 2T, 3T of SR-2 therefore open, removing the source of positive potential from one input of the OR gate composed of diodes D10 and D12. At the same time ground is removed from the plate of tube V12A through the opening of contacts 4T, 5T of relay SR-2. Relay puller tube V12B continues to conduct and therefore relay SR-1 remains energized until the input to the other side of the OR gate at D12 also drops. This occurs at the end of the character being transmitted when the beam in counter tube V3 reaches target (0). When the beam reaches targets 7, 8, 9 the negative potential applied to the grid of tube V12A through diode D13 cuts it off. Since diode D8 essentially short circuits resistor R1 for positive signals, there is only a very slight time delay before the positive signal at the plate of tube V12A appears at the grid of gate tube V11A and turns it on. Tube V11A current flow through R17 cuts off tube V2, stopping the multivibrator. This change of state of clock multivibrator 10 repels the beam of tube V3 from target (9) to target (0). The negative potential on target (0) is also connected to the grid of tube V12A through diode D14, holding the clock multivibrator "off." Target (0) is also connected to the other input of the OR gate, diode D12 through contacts 7T, 8T of relay SR-1. Diode D12 now ceases conduction, and as D10 was previously cut off when the electronic start signal was removed, there is no output from the OR gate. Tube V12B is therefore cut off by the negative grid bias set up by voltage divider R86, R53, and R52, thereby releasing relay SR-1.

The release of relay SR-1 does the following:

(1) Connects the marking contact of relay PR-1 to the grid return divider in the grid circuit of thyratrons V4 to V8 by the closing of contacts 4T, 5T of relay SR-1. The simultaneous opening of contacts 5T, 6T disconnects resistor R14 from the grid return circuit of gate clamp V10B. This allows tube V11B to operate while the distributor is in the receive condition.

(2) Diode D12 is disconnected from target (0) of the counter tube V3 by the opening of contacts 7T, 8T.

(3) The source of negative potential is applied to the grid of tube V13A through closed contacts 1B, 2B and resistor R87. This causes tube V13A to be cut off, effectively disabling relay PR-2 by holding it in the marking position while the distributor is receiving.

(4) Contacts 2B, 3B of relay SR-1 open, removing the negative voltage from the grid return divider in the grid circuit of thyratron V9, allowing it to function.

(5) Contacts 4B, 5B open which disrupts the path of the electronic start signal 45 to the coil of relay SR-2. This insures that relay SR-1 will be operated first when the start signal is reapplied. Relay SR-1 is therefore always the first to operate and the last to release.

(6) Contacts 6B, 7B open disconnecting load resistor R59 from the plate of tube V11B. This cuts off gate tube V10A when the distributor is receiving due to the connection of the source of negative potential to the grid of V10A through resistor R19.

At this point the switching action is completed and the distributor is in the receive condition. In the receive condition the distributor receives its input directly from the printing telegraph line (Input). The input to the distributor consists of characters in serial printing telegraph code. According to well known printing telegraph techniques the operation of the distributor in the receive condition is controlled by combinations of pulses of two significant values transmitted over the line circuit to which the distributor is connected. For seven and a half unit code operation as assumed herein, the line signal code employed to transmit characters consists of five selecting pulses or information bits used in various combinations of "marking" and "spacing" intervals. Each character composed of five information bits is preceded by a start pulse and followed by a rest or stop pulse. The rest pulse interval, as described herein, is one and one-half times as long as the selecting pulses, but the distributor will function equally well with rest pulses of other duration. The input line signal consists of either "marking" pulses, represented by a pulse of current on the line, or "spacing" pulses, represented by an absence of line current. Current on the line energizes relay PR-1 which therefore closes its "marking" contacts. An interruption of line current releases relay PR-1 and opens said contacts.

When the distributor is in the receive condition and no characters are being received, the line is steadily "marking," relay PR-1 is operated and its "marking" contacts closed. Until the first input character is received, the cathode of start detector tube V12A remains grounded through said normally closed marking contact of relay PR-1. However, the negative voltage on target (0), which is connected through diode D14 to the grid of tube V12A holds tube V12A cut off. The plate voltage of tube V12A is therefore a maximum, as is the grid voltage of gate tube V11A connected to this plate. The current through tube V11A is a maximum and therefore the voltage across resistor R17 in the cathode of V2 is also a maximum. This voltage biases V2 to cut-off and keeps clock multibrator 10 inoperative. The multivibrator remains inoperative until the first character is received over the line, that is, until tube V11A is cut off.

Each received character is preceded by a start pulse, which is a "spacing" pulse represented by an interruption of current on the line. The function of the start pulse is to trigger the clock multivibrator 10 into operation, which in turn causes the stepping tube V3 to operate. When the start pulse is received, relay PR-1 operates, opening its "marking" contacts, and replacing ground on the cathode of tube V12A by the source of negative potential connected through resistor R58 in parallel with resistors R71 and R72. This overcomes the negative grid bias from target (0) and allows tube V12A to conduct. When tube V12A conducts its plate voltage drops, said voltage drop being coupled to the grid of tube V11A through a delay circuit composed of adjustable resistor R1 and capacitor C14. After a time delay determined by the values of resistor R1 and capacitor C14, gate tube V11A is cut off by the negative signal from the plate of tube V12A. This reduces the voltage drop across resistor R17, allowing V2 to conduct and triggering the multivibrator 10 into operation. Operation of the multivibrator causes the beam in counter tube V3 to advance from target (0) to target (1). Succeeding multivibrator pulses advance the beam of the tube V3 from target to target.

The purpose of the multivibrator variable delay circuit composed of resistor R1 and capacitor C14 connected between the plate of tube V12A and the grid of tube V11A is to delay the appearance of the V12A plate voltage on the grid of tube V11A. This delay is adjusted to cause the clock multivibrator output pulses to occur a half-pulse behind the incoming line pulses, that is, at the midpoint of an incoming pulse. The multivibrator 10 does not start until half the first incoming pulse, which is the start pulse, has been received by the distributor. Therefore, the beam of counter tube V3 strikes or leaves a target at the midpoint of the received pulses. This delay is made variable for "ranging" purposes, that is, to allow compensation for "bias distortion" of the incoming pulses.

Figure 4:
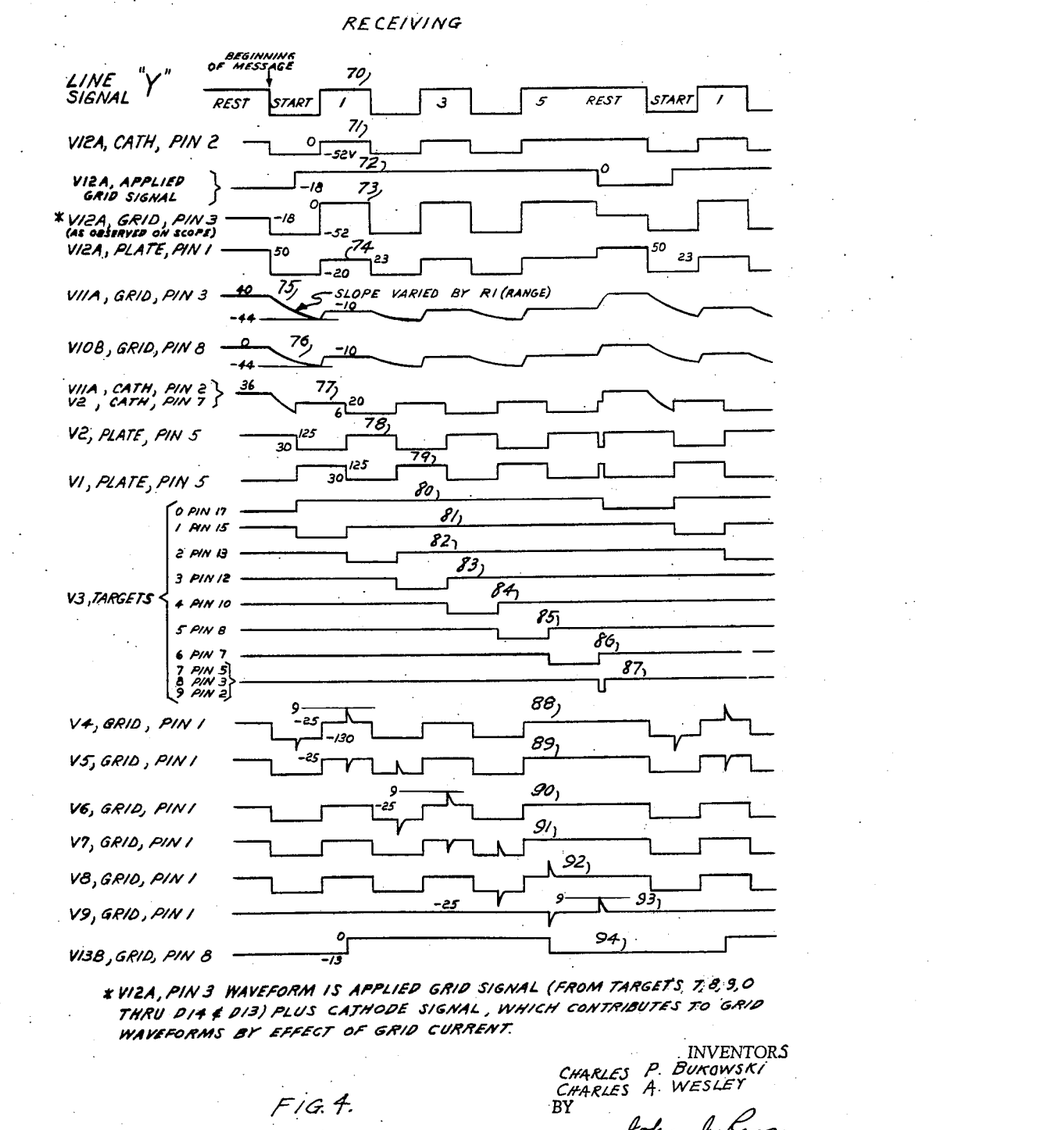
FIG. 4 is a series of correlated wave diagrams explanatory of the system of FIGS. 2A and 2B when in the receiving condition.

As an aid to the understanding of the receive operation of the distributor, let us again assume that the incoming line signal is a character whose first, third and fifth information bits are "mark." As described above, receipt of the start pulse causes the multivibrator 10 to operate in synchronism with the incoming line signals, but out of phase therewith by one-quarter cycle due to the action of the multivibrator variable delay circuit. An inspection of the timing diagram, FIG. 4, will aid in understanding the relationship of the multivibrator pulses to the incoming pulses. The clock multivibrator causes the beam of counter tube V3 to strike target (1) at the midpoint of the incoming start pulse, because of the delay circuit mentioned above. At this time the "marking" contacts of relay PR-1 are still open, therefore the grid of output thyratron V4, and also thyratrons V5 through V8, is held sufficiently negative to bias tube V4 to cut-off. This results because ground potential is removed from the upper ends of resistors R58 and R72, thereby causing point 51, connected to the grid return circuit of the five information thyratrons V4–V8, to go negative. Wave form 88 of FIG. 4 represents the voltage variations at the grid of tube V4. At the instant the beam strikes target (1), the potential of target (1) goes negative. This negative signal is differentiated and coupled to the grid of tube V4 by an RC differentiating circuit composed of capacitor C5 and resistor R66. This negative spike has no effect on tube V4 which is already biased to cut-off by the negative potential at point 51.

At the completion of the start pulse, the first incoming information bit is received by receiving polar relay PR-1. This first information bit was assumed to be a "marking" pulse, which therefore causes relay PR-1 to close its "marking" contacts. This causes the potential at the grid of tube V4 to become less negative because of the connection of ground potential to the upper ends of resistors R58 and R72. However, this voltage is still insufficient to cause tube V4 to conduct. At the midpoint of said first marking pulse the clock multivibrator 10 causes the beam of counter tube V3 to advance from target (1) to target (2). As the beam leaves target (1) the voltage on said target rises sharply. This rise in voltage is differentiated by the RC circuit composed of C5 and R66 and applied to the grid of tube V4 as a positive pip. The combination of the positive pip plus the lower negative bias at the grid of tube V4 triggers V4 into conduction. When V4 fires it operates a relay or other storage element connected in its plate circuit, which signifies a "marked" pulse to the external equipment. It can therefore be seen by reference to wave forms 70 and 88 of FIG. 4 that the first incoming "marking" pulse has been sampled substantially at its midpoint and stored in the external equipment. The beam of tube V3 is now on target (2).

The second incoming line pulse is a "spacing" pulse which causes relay PR-1 to open its "marking" contacts, removing ground from the upper end of resistors R58 and R72, thus causing point 51 to go negative. This action is similar to that which was described previously for the "spacing" start pulse. The negative potential of point 51 is connected to the grid of tube V5 by resistor R67, biasing tube V5 to cut-off. After half the incoming second hit has been received, the beam is advanced from target (2) to target (3) by multivibrator 10. This point is shown by the positive pip on wave form 89 of FIG. 4. As before, when the beam leaves a target its potential rises. Due to the RC differentiating circuit comprising C6 and R67, a positive spike or pip is coupled to the grid of tube V5. However, as the bias on the grid of V5 is highly negative because the "marking" contacts of relay PR-1 are open, said positive pip is insufficient to cause tube V5 to fire. If instead the incoming second bit were "marked," tube V5 would fire since its bias would be considerably lower. Since tube V5 does not fire, this signifies a "spacing" bit to the external equipment for the second incoming pulse. In a similar manner, the third incoming marking pulse fires tube V6, the fourth "spacing" pulse does not fire tube V7, and the fifth "marking" pulse fires tube V8. Tube V9 is fired every time the beam leaves target (6) because its grid bias is fixed and is not affected by the condition of polar relay PR-1. Conduction of tube V9 signals the external equipment that the character is completed.

It can be seen from wave forms 85 and 92 of FIG. 4, that as the beam leaves target 5, the information bits of the first character have all been received and stored in the output circuits of thyratrons V4 to V8. However, before the next character can be received, the counter tube beam must complete its cycle and come to rest on target (0). When the beam strikes target (6) at the midpoint of the incoming fifth bit, it makes that target negative. This negative potential is fed through diode D17 to the grid of relay puller tube V13B, cutting off this tube. This releases relay K in the plate circuit of tube V13B, which signals the external equipment that a bit for a new character is required. At the end of the incoming fifth pulse, the line reverts to the steady-state, or "marking" condition. The multivibrator 10, however, continues to operate and advances the beam to target 7, whereupon it is rapidly switched through target 8 to target 9. The negative potential on targets 7, 8, 9 is coupled through diode D13 to the grid of tube V12A, cutting off V12A, which as explained previously stops the clock multivibrator. This in turn switches the beam to target (0). Since resistor R1 is shorted by diode D8 for positive going signals, the rise in plate voltage of tube V12A appears at the grid of gate tube V11A with very little delay. Therefore, as can be seen from wave forms 78, 79, 80 and 87 of FIG. 4, the delay of multivibrator "turn off" is much less than the delay of "turn on." During the time the beam dwells on targets 6, 7, 8, 9, 0 and 1, the negative potential on these targets is also coupled through diodes D13, D14, D15, D17, and D18 to the grid of tube V13B, holding V13B cutoff and relay K deenergized until the beam again leaves target (1), at which time tube V13B again conducts causing relay K to again operate. When the beam reaches target (0) it locks on this target and remains locked thereon until the start pulse of the next character is received or the distributor is switched to the transmit mode by application of the electronic start signal. The negative potential on target (0) is transmitted through diode D14 to the grid of tube V12A, keeping V12A cut off until the start pulse of the next character causes its cathode to become negative and triggers tube V12A into conduction. The plates of output thyratrons V4–V9 are connected by means of separate leads to the external equipment, where each output lead may be connected to a storage device, such as a relay, which operates when the associated thyratron in the distributor fires. It has therefore been demonstrated how each incoming character consisting of a combination of pulses in serial form is stored in the external equipment and can be "read out" in parallel if desired.

An added function which it has been found desirable to add to the distributor is the gated clamp circuit V10B of FIG. 1. The details of this circuit are shown in FIG. 2. Clock multivibrator stability has been enhanced by returning the grid resistors R23, R25 to a positive voltage through an adjustable resistor R24 and also adding a clamp to limit the maximum grid excursion of tube V2 during the rest or stop pulse in the receive mode. Without this clamp, the grid of tube V2 would rise to the positive return voltage and result in an abnormally large charge on the multivibrator timing capacitor. This in turn would generate an abnormally long half-cycle when the multivibrator restarts with the next start pulse. The possibility of this excess grid excursion is prevented by tube V10B, diode D1, and the voltage divider composed of resistors R13, R16 and R15, which operate as a gated clamp. Tube V10B receives the same grid signal as tube V11A, and accordingly conducts during the stop pulse only. In one embodiment of the invention the voltage applied to the cathode of diode D1 is positive 12 volts during the stop pulse when tube V10B is "on," and positive 22 volts when V10B is cut off during the remainder of the character. The grid of tube V2 normally does not rise above positive 8 volts during a normal rest pulse of one and one half time units, nor above positive 20 volts during an information bit of unit time. The grid wave form is not clamped for normal operation, for when the cathode of diode D1 is positive 12 volts, its plate, which is coupled to the grid of tube V2, is at a maximum of positive 8 volts, and when the cathode of D1 is at positive 22 volts, its plate does not exceed positive 20 volts. Therefore, for normal operation diode D1 never conducts and there is no clamping action performed. If, however, the grid of V2 should have more than the normal one and a half units of time to rise due to the absence of incoming line signals for example, the grid would attempt to rise to positive 33 volts, which is the return voltage. When the grid of tube V2 reaches positive 12 volts, diode D1 would conduct and clamp said grid at this level. This is a negligible increase over the normal positive 8 volt grid potential compared with allowing the grid to rise to positive 33 volts.

If for any reason the beam of counter tube V3 should be extinguished, the counter tube V3 will be automatically reset to the "0" position. When the beam of tube V3 is off, there is no current flow from the source of positive potential to the targets of V3. As the coil of automatic reset relay AR is in series with the target common return conductor, relay AR releases, closing its contacts 52. This establishes ground potential on spade position (0), which causes a beam to be established on this spade. Current then flows through the coil of relay AR, opening contacts 52 and removing said ground from spade (0). The beam has now been reestablished on target (0) and the distributor is once again ready for operation.

While in the foregoing, one particular well known kind of beam stepping tube is used as the transceiving electronic distributor, it will be understood that any other well known type of such tube can be used so long as the beam can be automatically stepped to a series of targets in cylical succession to produce at those targets synchronous informational telegraph signal elements prefaced by a start element and followed by a stop or rest element. Likewise while the grid controlled electron tubes have been illustrated for the various gates, relay pullers and the like, it will be understood that equivalent devices such as transistors can be substituted therefor within the scope of the invention.

Other changes and modifications may be made in the disclosed embodiment without departing from the spirit and scope of the invention as defined in the appended claims.

What is claimed is:

1. Automatic transceiver distributor apparatus to be connected to a transmission line for transmitting and receiving coded combinational signal elements of the type wherein each character is represented by a group of said elements, said apparatus comprising code defining means including elements settable in permuted combinations by an external equipment serving as the source of data to be transmitted, a pulse distributor having a plurality of distribution circuits which are sequentially energized, output means coupled to said code defining means and including means operable with said pulse distributor to translate a parallel code character set up on said code defining elements into a serial output character; input means to receive a serial input code signal, signal detection means adapted to be set in permuted combinations under joint control of said input signal and said pulse distributor, signal utilization means actuated by said detection means to convert said serial input code signal into a corresponding parallel code character; start signal means operable by said external equipment and arranged to produce an electrical start signal during the time said external equipment is conditioned to transmit a message; relay means automatically operable by said electrical start signal, and circuit means responsive to the operation of said relay means for switching said pulse distributor alternatively as a transmitting distributor and as a receiving distributor in accordance with the conditioning of said relay means.

2. Automatic transceiver distributor apparatus to be connected to a transmission line for transmitting and receiving coded combinational signal elements of the type wherein each character is represented by a group of said elements, said apparatus comprising code defining means including elements settable in permuted combinations by an external equipment serving as the source of data to be transmitted, a pulse distributor having a plurality of distribution circuits which are sequentially energized, output means coupled to said code defining means and including means operable with said pulse distributor to translate a parallel code character set up on said code defining elements into a serial output character; input means to receive a serial input code signal, signal detection means adapted to be set in permuted combinations under joint control of said input signal and said pulse distributor, signal utilization means actuated by said detection means to convert said serial input code signal into a corresponding parallel code character; start signal means operable by said external equipment for producing an electrical start signal during the time said external equipment is conditioned to transmit a message; switch means automatically operable by said start signal for connecting said pulse distributor alternatively as a transmitting distributor and a receiving distributor; hold means for maintaining said switch means in transmit condition subsequent to the generation of said start signal, and signal sensing means responsive to the completion of a transmitted character group for releasing said hold means, whereby said switch means automatically reverts to its receive condition after said start signal is cut-off and the last element of the last character has been fed to said transmission line from said external equipment.

3. Automatic transceiver distributor apparatus to be connected to a transmission line for transmitting and receiving coded combinational signal elements of the type wherein each character is represented by a group of said elements, said apparatus comprising code defining means including elements settable in permuted combinations by an external equipment serving as the source of data to be transmitted, a pulse distributor having a plurality of distribution circuits which are sequentially energized, one of said distribution circuits being activated upon the completion of transmission of each character, output means coupled to said code defining means and including means operable with said pulse distributor to translate a parallel code character set up on said code defining elements into a serial output character; input means to receive a serial input code signal, signal detection means adapted to be set in permuted combinations under joint control of said input signal and said pulse distributor, signal utilization means actuated by said detection means to convert said serial input code signal into a corresponding parallel code character; start signal means operable by said external equipment for producing an electrical start signal during the time said external equipment is conditioned to transmit a message; relay means operable by said start signal, said relay means including first switch means for connecting said pulse distributor alternatively as a transmitting distributor and a receiving distributor in accordance with the conditioning of said relay means; an OR circuit for energizing said relay means, one of the inputs to said OR circuit being coupled to the output of said start signal means; second switch means operable by said relay, the other of the inputs to said OR circuit being coupled through said second switch means to said one distribution circuit which is energized upon the completion of transmission of a character.

4. Automatic transceiver distributing apparatus comprising an electron beam stepping tube having a plurality of targets, means for sequentially shifting the beam of said tube along said targets, one of said targets serving as the "rest" position for the beam upon completion of a distribution cycle, a plurality of code defining means adapted to be activated in permuted combinations by an external equipment to define a desired parallel code character, connection means coupling each of said code defining means to a respective one of said targets, output means coupled to said code defining means and operable by the beam of said tube to produce a serial output signal corresponding to said parallel code character; a plurality of signal sensing means each coupled to a respective one of said targets, input means arranged to couple a serial input code signal to said sensing means, a plurality of signal utilization means each connected to a respective one of said sensing means, said sensing means being jointly operable by said input code signal and the beam of said tube to actuate said utilization means and thereby to define a parallel code character corresponding to said serial input code signal; start signal means operable by said external equipment for producing an electrical start signal while said external equipment is conditioned to transmit a message; relay means operable by said start signal and including switch means operable to render said signal sensing means effective during absence of said start signal and ineffective while said start signal is present, holding means for maintaining said relay means in condition to render said signal sensing means ineffective during transmission of a message from said external equipment, and circuit means responsive to the energization of said one target while said electron beam is in rest position, said circuit means being operative thereby to disable said holding means, whereby said distributing apparatus automatically reverts to receive condition when said start signal is cut-off and the last character has been fully transmitted.

References Cited in the file of this patent

UNITED STATES PATENTS

| | | |
|---|---|---|
| 2,568,779 | Veaux | Sept. 25, 1951 |
| 2,648,725 | Wright et al. | Aug. 11, 1953 |
| 2,677,723 | McCoy | May 4, 1954 |
| 2,733,409 | Kuchinsky | Jan. 31, 1956 |
| 2,859,278 | Canfora et al. | Nov. 4, 1958 |
| 2,968,693 | Gaffney et al. | Jan. 17, 1961 |